United States Patent [19]
Dyer et al.

[11] 4,130,485
[45] Dec. 19, 1978

[54] NOVEL FILTRATION PROCESS AND APPARATUS

[75] Inventors: Gerald T. Dyer, Weston; Michael A. Ryan, Framingham, both of Mass.

[73] Assignee: Polaroid Corporation, Cambridge, Mass.

[21] Appl. No.: 795,653

[22] Filed: May 10, 1977

Related U.S. Application Data

[63] Continuation-in-part of Ser. No. 613,618, Sep. 15, 1975, abandoned, which is a continuation-in-part of Ser. No. 418,058, Nov. 21, 1973, abandoned.

[51] Int. Cl.² ............................................. B01D 29/00
[52] U.S. Cl. ........................................ 210/66; 210/82; 210/196; 210/333 R; 210/411
[58] Field of Search .................... 210/61, 71, 76, 82, 210/196, 333 R, 410, 411, 510, 66

[56] References Cited

U.S. PATENT DOCUMENTS

| | | | |
|---|---|---|---|
| 2,956,944 | 10/1960 | Logan et al. | 210/66 X |
| 3,056,500 | 10/1962 | Carter | 210/196 X |
| 3,117,084 | 1/1964 | Nick et al. | 210/411 X |
| 3,482,703 | 12/1969 | Roberts et al. | 210/510 X |
| 3,751,271 | 8/1973 | Kimura et al. | 210/510 X |

*Primary Examiner*—John Adee
*Attorney, Agent, or Firm*—Gaetano D. Maccarone; John P. Morley

[57] ABSTRACT

Process and apparatus for separating particulate material from fluids. Essentially, the process and apparatus involves passing a dispersion of particulate material in a fluid through a porous, solid tubular member, which can retain the particulate material within the tubular member but permits passage of the fluid therethrough. The process and apparatus disclosed are especially useful in washing and/or adjusting the concentration of particulate materials dispersed in fluids by recycling the dispersion through the porous member until the concentration of dispersed particulate material is increased to a predetermined degree.

24 Claims, 4 Drawing Figures

NOVEL FILTRATION PROCESS AND APPARATUS

CROSS-REFERENCE TO RELATED PATENT APPLICATION

This application is a continuation-in-part of U.S. application Ser. No. 613,618, filed Sept. 15, 1975 (now abandoned) which in turn is a continuation-in-part of U.S. application Ser. No. 418,058, filed Nov. 21, 1973 (now abandoned).

BACKGROUND OF THE INVENTION

1. The field of the Invention

This invention relates to novel processes and apparatus for separating dispersed particulate material from fluids containing such material.

2. Description of the Prior Art

Many processes and apparatus for filtering or separating particulate solids from solids/fluid dispersions are known to the art. Perhaps the best known are those processes and apparatus adapted for batch type filtrations. In such filtrations, a fluid having a particulate solid dispersed therein is added to apparatus having porous filtration means which retains the solid but permits the fluid to be transmitted through the filtration means. Pressure and vacuum are usually employed to accelerate the rate of filtration in manners well known to the art. Filtrations of this type are usually slow and cannot be operated in a truly continuous fashion since some accomodation must be made to remove accumulated solids retained by the filtering means; otherwise filtration rates can be diminished to a point where they become ineffective.

Continuous filtration processes and apparatus are also known to the art and involve techniques broadly defined as ultrafiltration and hyperfiltration with the last term usually including reverse osmosis. Ultrafiltration essentially involves the separation of a solvent from a relatively high molecular weight, dispersed or dissolved solute by forcing the solvent through a membrane providing preferential passage for the solvent as opposed to the dissolved solute. Low pressures in the order of about 10 to about 100 psi are usually involved and turbulent flow conditions are required to maintain efficient transfer of solvent vs. solute at the membrane surface.

Hyperfiltration (reverse osmosis) differs from ultrafiltration primarily in the size and molecular weight of the dispersed solute. Essentially, the technique involves the separation of solvent from solutions of low molecular weight salts by forcing the solvent through a membrane under high pressures in the order of from about 400 to 2000 psi. The performance characteristics of the membrane employed in hyperfiltration are much more critical than in the case of the ultrafiltration membrane especially in that the membrane is designed to allow passage of only solvent therethrough.

Membranes employed in the above mentioned ultrafiltration and hyperfiltration techniques are known to the art. They are normally fabricated of porous, film forming plastomeric materials and the membranes are oftentimes disposed on porous substrates or screens for reinforcement. Recently, membranes have been formed on porous substrates in the manner described in "Hyperfiltration Processing of Pulp Mill Sulfite Wastes With a Membrane Dynamically Formed From Feed Constituents" Environmental Science and Technology Vol. 1, Number 12 December 1967 and "Hyperfiltration Studies v. Salt Rejection By Dynamically Formed Hydrous Oxide Membranes" JACS 88:24, Dec. 20, 1967 and "Hyperfiltration" Ind. Eng. Chem., Process Des. Develop., Vol. 9, No. 4, 1970. Additional helpful details relating to hyperfiltration techniques can be found in Volume II of *Recent Developments In Separation Science* published by Chemical Rubber Company (CRC) Press in 1972 and especially in an article at pages 205–225 entitled "Cross Flow Filtration" by J. D. Henry, Jr.

In these articles, a so called "dynamic" membrane is established by depositing film forming materials such as resins, gels, and polymers on surfaces of porous substrates to provide a membrane useful for separating solvent from dispersed or dissolved solute. The designation of the membranes so formed as "dynamic" may be somewhat misleading since the membranes are actually static, permanent films deposited on the porous substrate surface and regeneration of the membrane is apparently required during operation.

The present invention is addressed to the problems involved in separating particulate solids from solids/fluid dispersions and provides novel processes and apparatus for continuously filtering such dispersions in an especially efficient fashion.

SUMMARY OF THE INVENTION

In accordance with the practice of the present invention particulate solids are separated from solids/fluid dispersions by passing such dispersions through filtration means which comprise at least one solid, porous tubular member. The most preferred tubular members are those fabricated of metal especially those fabricated of sintered, stainless steel and having a continuous porous surface. Such sintered stainless steel tubular members are known products of commerce and are presently employed in the art as "air rolls."

The essence of the present invention resides primarily in the discovery that solid, porous tubular members of the type described above provide especially effective, continuous filtration means for separating particulate solids from solid/fluid dispersions. Such tubular members are particularly effective in separating particulate solids having a distribution of particle diameters ranging between 0.1 micron to about 50 microns and especially particulate solids having a distribution between about 0.1 microns to about 30 microns from dispersions of such particles in fluids, e.g., gases or liquids.

In the preferred practice of the present invention the filtering means comprises at least one—but preferably a plurality—of tubular metal porous members having a common inlet and outlet. The porous metal tubular members can have a micron rating between about 0.5 to about 5 microns; that is to say, the members are substantially impermeable to particles of a size corresponding to or above the rating number. The preferred process and apparatus of the present invention further include the steps of and means for passing the solids-fluid dispersion through the porous member(s) and recycling the dispersion through said members until the predesired degree of separation is obtained.

One of the especially unexpected features of the process and apparatus of the present invention resides in the discovery that porous members having a micron rating higher than the particle diameter of some of the dispersed particulate solid can be effectively employed. In other words, porous tubular members having pore sizes larger than some of the dispersed particulate solids can be employed to filter dispersions containing such particles by effectively retaining such smaller particles within the confines of the tubular member. For example, it has been found that porous tubular members having micron ratings up to about twenty times greater than the particle diameter of some of the dispersed particles can effectively retain such particles within the confines of the porous tubular member.

The actual mechanism involved in the filtration of the present invention has not been precisely defined. However, the mechanism is considered to be distinctively different than that involved with the so-called "dynamic" membranes described above. It is believed that the essence of the filtration mechanism involves a partial plugging of individual pores since a continuous film or "membrane of solute" is not believed to be formed on the inner surface of the tubular porous member. Instead, apparently each pore has a given population of individual particles smaller in size than the internal diameter of the pores. These smaller particles are believed to be mobile in the pore but nevertheless partially plug the pore to prevent transfer of the particles through the pore but allow only transfer of solvent therethrough. It is also believed that the population of particles occupying each pore is continually changing, e.g., the individual particles occupying the pore are constantly being displaced and replaced by other individual particles of the dispersion being circulated through the tubular member.

In the practice of the present invention, the establishment of an effective pore plugging mechanism of the type described above is best determined by reference to the flux rate which is (filtration rate [volume/time]/area). For example, oftentimes in the start up of processes and apparatus of the present invention for filtration of solid/fluid dispersions where some of the particles are smaller in size than the pore diameter, a drop in flux rate is intially noted sometimes accompanied by the passage of smaller particles through the pores. However, within a short time, the observed drop in flux rate diminishes and also passage of the smaller particles through the pores no longer occurs. The decrease in flux rate is rather rapid during that time required to establish an effective pore plugging mechanism, e.g., the increment of time between start up and that time when the drop in flux rate diminishes. However, the total reduction in flux rate is usually not significant and once the pore plugging mechanism is established it can be effectively maintained over rather extended periods of operation.

DESCRIPTION OF THE PREFERRED EMBODIMENTS OF THE INVENTION

Figure 1:
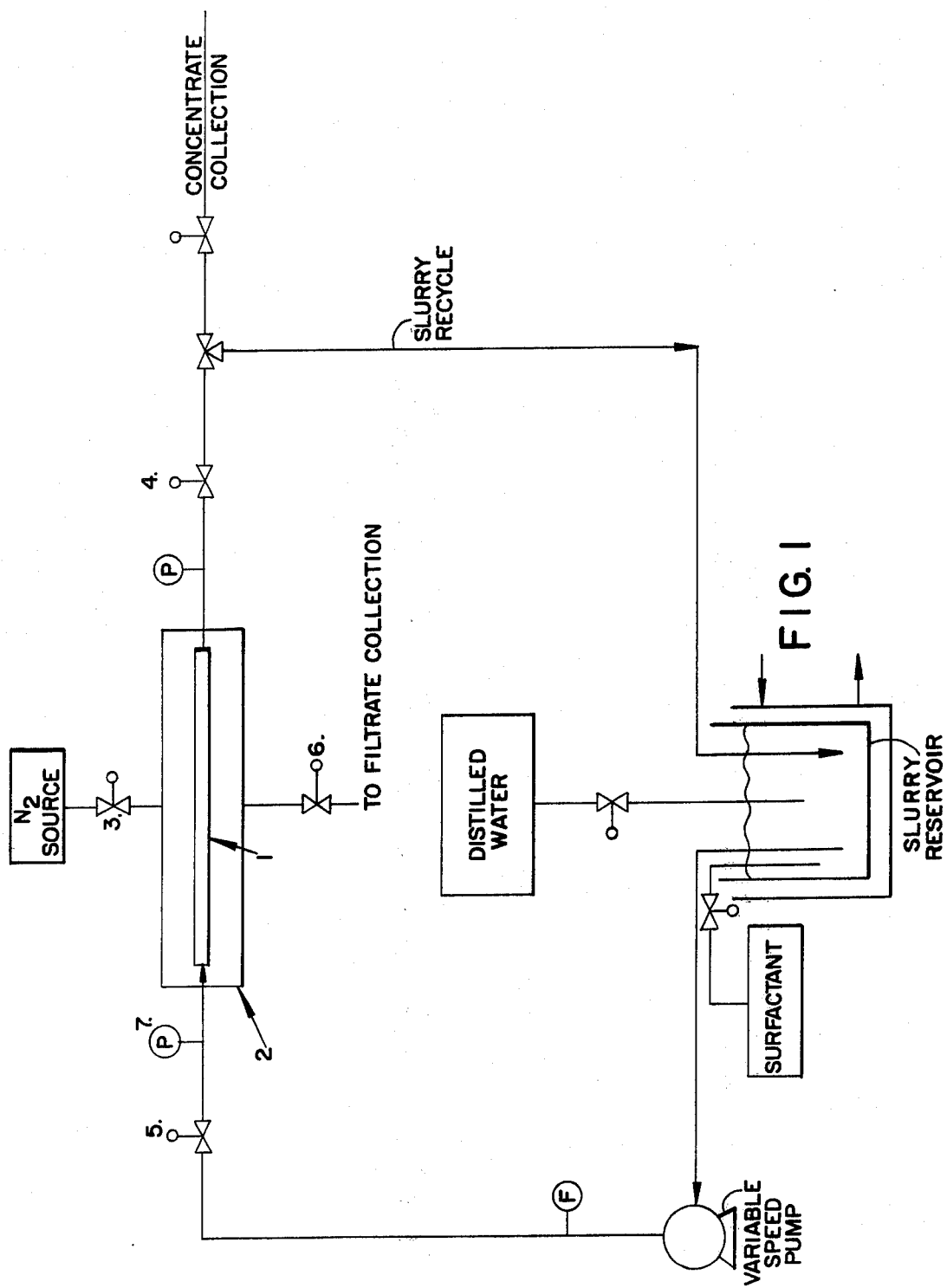
FIG. 1 is a flow diagram of a simplified arrangement of apparatus suitable for the practice of the present invention.

Referring now to FIG. 1, there is shown a diagram of an arrangement of apparatus advantageously used in the practice of the present invention. Essentially, the apparatus of FIG. 1 comprises a porous tubular filtration element 1 which in this case was a porous stainless steel tube ($2\mu$ pore size, $\frac{1}{4}'' \times 18'' \times 1/16''$). Surrounding the filtration element 1 is a substantially air tight pressure casing or chamber 2 which primarily is used to collect filtrate from filtration element 1. However, as will be explained in more detail later, a pressurized fluid preferably a gas is perodically injected into chamber 2 through valve 3—perferably with valve 6 closed. This periodic injection of a pressurized fluid into chamber 2 provides means for back flushing or sparging the pores of filtration element 1 so that an efficient pore plugging mechanism can be maintained during extended operation of the apparatus.

The illustrated apparatus of FIG. 1 has been employed in the washing and concentration of aqueous or essentially aqueous dispersions of particulate cyan, magenta and yellow dye developers. In the production of such dye developers the final product is in the form of a wet cake of particulate dye particles which must be washed and reduced in particle size for effective ultimate use. In the practice of the present invention, the particulate dye particles are first dissolved and then precipitated to provide a slurry having a particular particle size distribution. The slurry is then circulated through apparatus of the type shown in FIG. 1 to reduce the volume of fluid in the slurry and increase the percentage of solids in the slurry to an efficient level. The slurry is then subjected to two distinct operations. In the first operation, the product is washed by continually filtering the fluid from the slurry and continually adding fresh wash fluid to the circulating slurry until the desired degree of purity is achieved. The second operation involves concentrating the slurry to obtain a dispersion having a particle size and concentration which provides for efficient transportation and storage as well as for easy dispersion of the particles into suitable matrix forming materials to provide layers comprising photographic dye developers which are ultimately included in photographic film units.

In the first operation, e.g., the washing operation, the slurry comprises a mixture of a minor amount of primary particles with a predominant amount of flocculated particles made up of primary dye particles. The average particle diameter of the slurry is about $3\mu$ but the particle size distribution can range between about $0.1\mu$ to about $50\mu$. By average particle size it is meant that the greater number of particles are of the size recited although smaller numbers of particles of larger or smaller diameter can be present. Slurries having average particle diameters of about $3\mu$ are especially preferred since particles of this size can be dispersed after the concentration operation more efficiently in matrix providing materials and further provide optimum performance characteristics as dye developers in dye developer containing layers.

In an illustrative filtration process of the present invention, the pore plugging mechanism is achieved during the time the slurry is circulated through the apparatus to reduce the volume of fluid. As mentioned, the achievement of an effective pore plugging mechanism is best evidenced by the flux rate which after start up initially decreases quite rapidly and oftentimes during the decrease, the loss of some particulate material through the porous tubular member is observed. However, the decrease in flux rate does not continue for an extended period and instead, within a relatively short time, reaches a substantially constant level. At this equilibrium point an effective pore plugging mechanism is established and no further loss of particles through the porous member is observed. Once the pore plugging mechanism is established, the flux rate remains substantially constant but some further decrease may be noted especially over extended periods of operation. Accordingly, in the preferred embodiment of the present invention, means are provided to periodically reinstate or maintain the flux rate as near as possible to that intially evidencing the establishment of the effective pore plugging mechanism. Such means include back flushing or sparging techniques and involves apparatus known to the art.

The slurry is then subjected to a washing operation which essentially involves continuous dilution of the fluid of the original slurry by constantly adding fresh fluid to the slurry by circulating the slurry through the porous tubular members until the desired degree of purity is obtained.

During the second operation, e.g., the concentration operation, the particle diameter distribution of the dispersed particles remains about the same but usually a surfactant is added to the slurry to prevent viscosity increases as the concentration proceeds. Essentially, the concentration operation involves circulating the slurry through the tubular members—without adding fluid—until the desired concentration is obtained. It should be understood that throughout both operations, e.g., the washing and concentration, particles having a particle size smaller than that of the pore diameter are present in the slurry. However, because of the conditions of the operations, the actual concentration of such smaller sized particles in the slurry at any given time in the operation cannot be precisely estimated.

Details relating to the present invention as well as manners of practicing same will be better appreciated by reference to the following Examples taken together with FIGS. 1-4.

EXAMPLE 1

A slurry of a metal complexed cyan dye developer of the type disclosed in U.S. Pat. No. 3,482,972 may be prepared by dissolving about 50 gms. of the dye developer in about 750 mls. of methylcellosolve and thereafter precipitating the dye by adding the solution to about 1.25 gallons of water at a pH of 2.0 to 2.2.

Referring now to FIG. 1, about 5 gallons of the slurry of a photographic dye developer are charged to the slurry reservoir. Essentially, the slurry comprises about 1% by weight of dye dispersed in a fluid which is a mixture of water and methylcellosolve and the average particle diameter of the dispersed dye in $3\mu$ while the particle size distribution of the dispersed dye ranges from about $0.1\mu$ to about $50\mu$.

The volume of fluid is then reduced by circulating the slurry through the filtration element (1) initially without any back pressure at a flow rate greater than about 10 ft./sec. and preferably at a rate of about 12 ft./sec. Thereafter outlet valve 4 is closed until inlet pressure gauge 7 reads about 22-24 psi. Circulation of the slurry is continued without the addition of wash fluid, e.g., distilled water, until the inlet pressure 2 increases slightly, e.g., to about 26-28 psi. When the increase is detected, distilled water is added to the reservoir at a rate equivalent to the rate of removal of fluid through the porous tube. Circulation of the slurry and addition of distilled water is continued until the desired degree of purity is obtained.

During the above-described washing operation, the inlet pressure remains substantially constant over prolonged periods. However, after extended periods, e.g., one hour or longer, a progressive increase in inlet pressure is oftentimes noted. With equipment of the type shown in FIG. 1, it has been found that the overall optimum efficiency is impaired if the inlet pressure is permitted to exceed 30 psi. Accordingly, means are provided to sparge or flush the pores of the filtration element (1) to maintain the inlet pressure between about 20-30 psi. Essentially, the sparging means is brought into operation by opening valve 3 to inject nitrogen into chamber 2 at about 50 psi to the system. Obviously, valve 6 is preferably closed during the sparging operation. Opening of valve 3 for about 5 seconds is usually sufficient to sparge or flush the pores of element 1 enough to rapidly reduce the pressure to the optimum level. In larger scale filtration systems, the sparging means is integrated with other elements to intermittently operate automatically at predetermined intervals.

After the washing operation is complete, a surfactant is preferably added to the slurry reservoir to maintain the viscosity of the slurry during the concentration operation. The amount of surfactant added can vary but usually an amount sufficient to provide about 0.5% by weight of surfactant for the slurry is suitable. The introduction of the surfactant usually reduces the flux rate during the concentration operation primarily because agglomerated particles are broken up. Recirculation of the slurry through the filtration tube continued until the concentration of dye in the slurry is about 11% by weight. In the preferred practice of the invention, sparging is usually not employed during the concentration operation and additional surfactant may be added to maintain the concentration of surfactant in the fluid at about 5% by weight. This amount of surfactant in the slurry is usually sufficient to prevent substantial pressure build up during the concentration operation.

Slurries of dye developers processed in accordance with the above disclosed washing and concentration procedures have been found to meet or exceed the following specifications after completion of the operation.

% solid in concentrated slurry $\geq$ 9.5%
% recovery of original solid dye $\geq$ 95%

EXAMPLE 2

The following data provides verification of the pore plugging mechanism as the operational mechanism in the practice of the present invention. The most important difference between a filtration involving a dynamic membrane mechanism and a pore plugging mechanism is the dependence of flux rate (filtration rate [volume/time]area) upon flow conditions. With a dynamic membrane mechanism operative, as flow rate (Reynold's number) increases, the thickness of the mass transfer limited boundary layer will decrease, resulting in increased flux rates. This characteristic is not expected in a single pore plugging mechanism except at extremely low flow rates where appreciable cake build-up at the surface may occur, resulting in a decline in flux rate.

Figure 2:
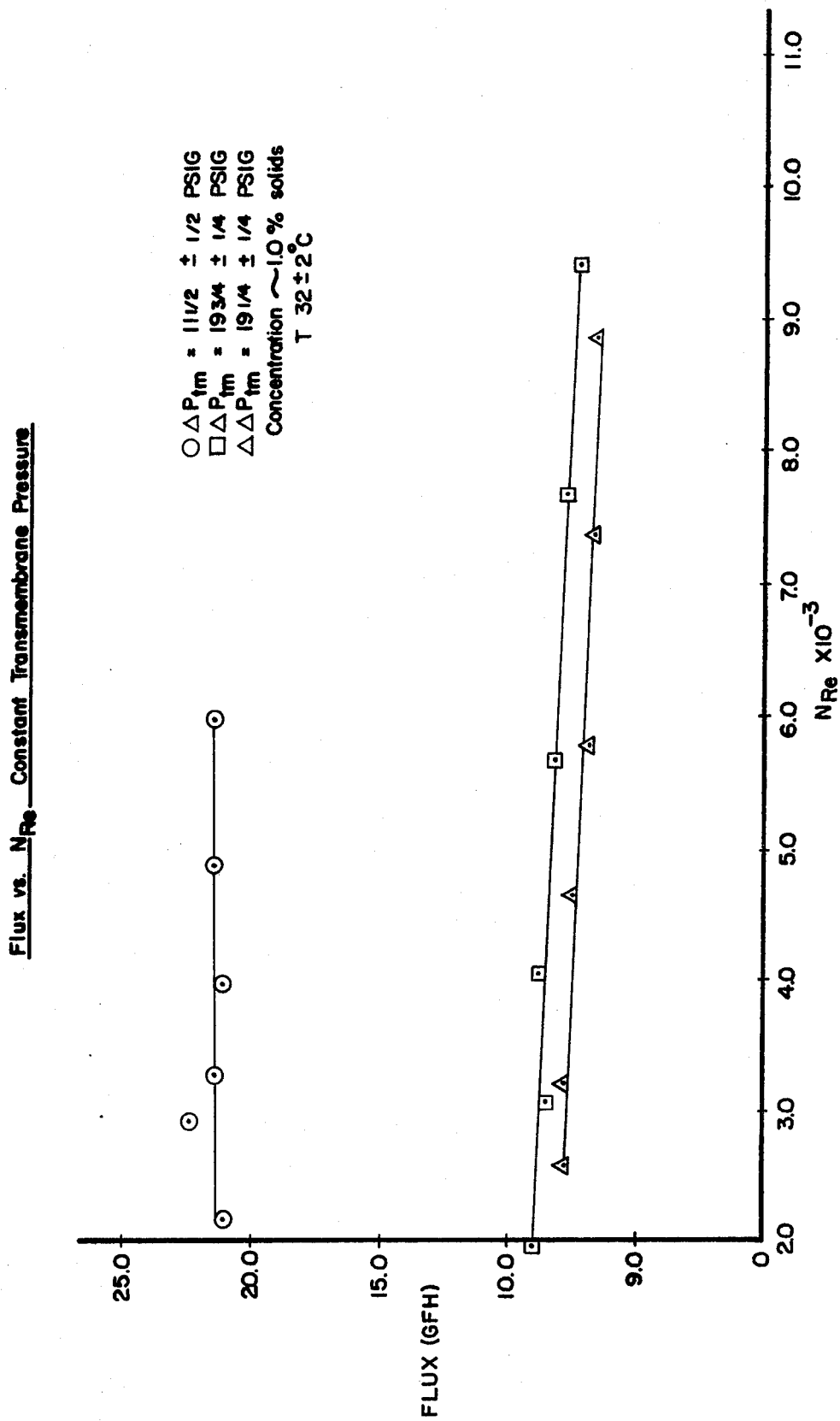
FIGS. 2-4 provide a graphical representation of data obtained in Examples 2-4 respectively.

A series of experiments was conducted to determine the effects of flow rate variation. Both a small-scale experimental apparatus consisting of a single porous tube ($2\mu$ pore size, $\frac{1}{4}$" × 18" × 1/16") and a large scale, 19 tube unit ($2\mu$ pore size, $\frac{1}{4}$" × 18" × 1/16") were used in these experiments. Both apparatus were designed so that pressure, temperature and flow conditions could be varied independently. FIG. 2 presents the typical results of a run where flow rate (Reynold's number) was varied while other variables were maintained constant. It is evident that flow rate has little discernable effect upon unit performance over the Reynold's number range 2000 to 9400. In other studies, the range was extended to $500 \leq N_{Re} \leq 17,700$ with the same behavior exhibited. This evidence is considered to clearly establish that pore plugging—rather than a dynamic membrane—is the mechanism involved in the practice of the present invention.

EXAMPLE 3

A series of studies were carried out in apparatus of FIG. 1 to pinpoint the important process variables and establish performance characteristics. Of particular interest were the effects of $\Delta P_{TM}$, average pressure driving force upon flux rates. Since processing efficiency is directly related to the magnitude of the flux rate, this characteristic is considered to be a most important variable.

Figure 3:
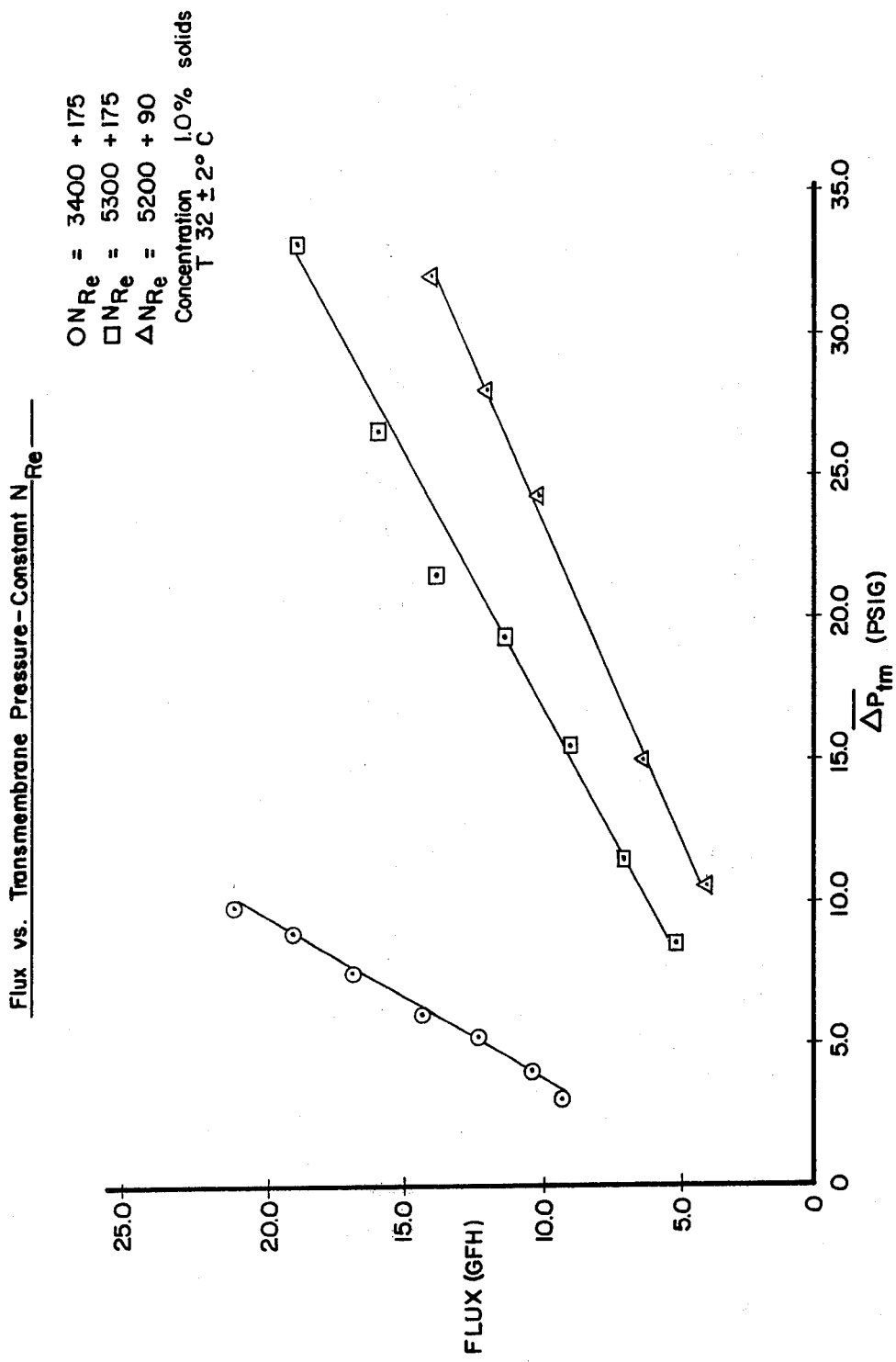

The average pressure driving force for the tubular filtration element is defined as follows:

$$\overline{\Delta P} = \frac{P_{in} - P_{out}}{2} - Ph$$

wherein $P_{in}$ and $P_{out}$ are inlet and outlet pressures respectively and pH is the hydrostatic head which resists flow on the filtrate side of the unit. FIG. 3 presents typical results of one run where $\overline{\Delta P}$ was varied as flow rate, temperature, and concentration were held constant. A perfectly linear correlation between flux rate and $\overline{\Delta P}$ is evident. This behavior is consistent with the pore plugging mechanism unaccompanied by significant cake build-up at the surface (i.e. the surface is kept relatively clean by flow inside tubular element). Of the major process variables that can be easily controlled (pressure driving force and flow rate), the above results pinpoint $\overline{\Delta P}$ as the critical performance variable.

EXAMPLE 4

Figure 4:
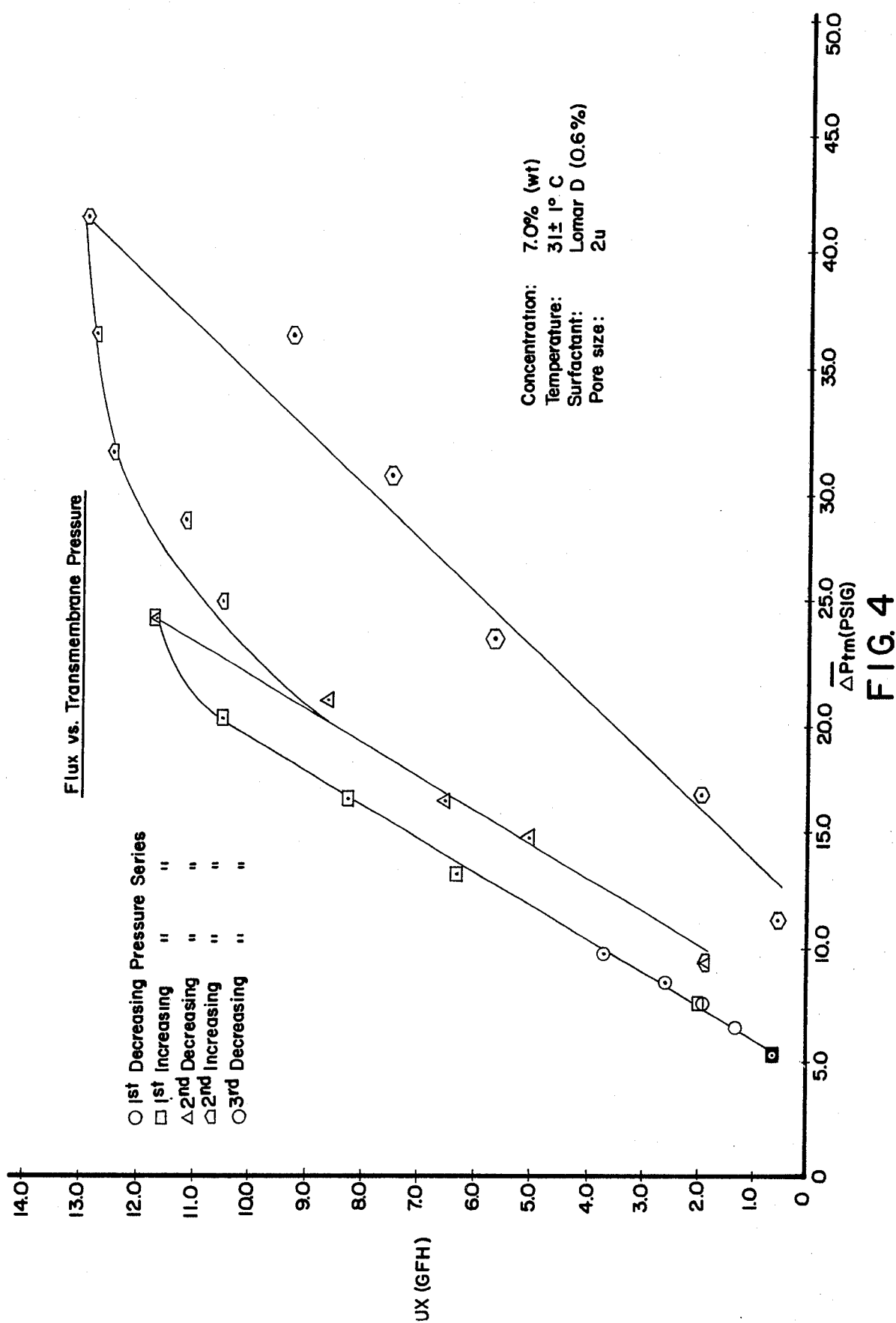

FIG. 3 indicates that processing should be carried out at the highest practical average pressure driving force to maximize flux rates. FIG. 4 presents data obtained during a run on apparatus of FIG. 1. Holding other variables constant, $\overline{\Delta P}$ was first decreased from 10 PSIG, (first decreasing pressure series) yielding the expected linear correlation. Pressure was next increased by stages to 24 PSIG (first increasing pressure series) and an interesting phenomenon observed: flux rate began to level off at about 20 PSIG. Upon decreasing pressure, (second decreasing pressure series) a new linear operating line was established, but at lower rates for given pressures than originally. Upon further increases to 42½ PSIG, (second increasing pressure series) similar, but some pronounced, behavior was observed. The indications are that above a threshold of 20–25 PSIG average pressure driving force, some progressive pore plugging occurs which adversely affects unit performance. The obvious implication from the above data is that a $\overline{\Delta P}$ between about 15 to about 25 provides the most efficient flux rates.

From the foregoing description, it will be appreciated that the apparatus and process of the present invention provides efficient filtration of solid/fluid dispersions in a truly continuous fashion. In terms of unexpected advantages, the operation of the processes and apparatus presented provides effective filtration of dispersions having particles of a diameter size which can be in the order of about 20 times less than that of the pore rating of the tubular members and this filtration can be accomplished by the use of relatively low pressures, e.g., pressures less than about 50 psi. The process and apparatus of the present invention can be applied to the filtration of solid/fluid dispersions wherein all or only some of the particles have particle diameters smaller than the pore rating of the tubular member. However, the process and apparatus are especially effective when applied to the filtration of solid/fluid dispersions where the solid constitutes no more than about 20% by weight of the total dispersion and the viscosity of the dispersion can range between about 20 to about 850 centipoises at about 30° C. which is the preferred operating temperature.

As mentioned, the filtration process and apparatus has been advantageously applied to the washing and concentration of the primarily aqueous dispersions of photographic dyes. In this application, a large scale unit having a plurality of filter units providing about 54 ft.$^2$ of porous filtration surface performs a cycle of the washing and concentrating operations on a dispersion of about 50 kilograms of dye in about 10 hours. In the past, the time involved for performing such operations was about 100 hours when expensive equipment such as ultra filters were used and 50 hours using fixed bed filters. In contrast, the process and apparatus of the present invention is relatively inexpensive, uncomplicated, easy to operate and performs these operations in an especially efficient and continuous manner. For example, the filter units can be easily cleaned in conventional fashion and with common cleaning materials so that differently colored dyes can be processed in the manner described. In fact, the above-mentioned large scale unit has satisfactorily performed at least 250 cycles of such filtration and concentrating operations as applied to various dye dispersions without requiring replacement of the filter units involved.

What is claimed is:

1. A process for filtering solid/fluid dispersions wherein said dispersion comprises solids having a particle size distribution between about 0.1μ to about 50μ and which comprises the step of circulating said dispersion through apparatus having filtration means comprising at least one tubular member having a rigid, porous wall providing pores having a micron rating between about 0.5 to about 5 microns and maintaining said dispersion at a flux rate sufficient to prevent any substantial number of particles having a particle size less than said micron rating from passing through said pores whereby filtration of said dispersion is achieved by removing fluid through said pores while increasing the concentration of solids in said dispersion as said dispersion is circulated through said hollow member.

2. A process of claim 1 wherein the average particle size of said solids of said dispersion is about 3μ.

3. A process of claim 1 wherein said filtration means comprises a plurality of said tubular members.

4. A process of claim 1 wherein said dispersion is circulated through said filtration means under an average pressure driving force between about 15 to about 25 psi.

5. A process of clam 1 wherein a fluid is periodically introduced into said filtration means at elevated pressure to maintain said flux rate.

6. A process of claim 1 wherein said solids in said dispersion constitutes no more than about 20% by weight of said dispersion.

7. A process of claim 1 wherein additional fluid is added to said dispersion while said fluid is circulated through said apparatus.

8. A process for filtering solids/fluid dispersions wherein said dispersion comprises solids having a particle size distribution between about $0.1\mu$ to about $50\mu$ and wherein said solids in said dispersion constitutes no more than about 20% by weight of said dispersion and the viscosity of the dispersion is between about 20 to about 850 centipoises at 30° C. and which comprises the step of circulating said dispersion through apparatus having filtration means comprising at least one rigid, tubular porous member having a micron rating between about 0.5 to about 5 microns and maintaining said dispersion at a flux rate sufficient to prevent any substantial numbers of particles having a particle size less than said micron rating from passing through said pores and adding additional fluid to said dispersion during circulation thereof unitil said fluid attains a predetermined degree of purity.

9. A process of claim 8 wherein the average particle size of said solids of said dispersion is about $3\mu$.

10. A process of claim 8 wherein said filtration means comprises a plurality of rigid, hollow, porous members.

11. A process of claim 8 wherein said dispersion is circulated through said filtration means under an average pressure driving force between about 15 to about 25 psi.

12. A process of claim 8 wherein a fluid is periodically introduced into said filtration means at elevated pressure to maintain said flux rate.

13. A process of claim 8 further including the steps of terminating the addition of said fluid and thereafter continuing the circulation of said dispersion until the concentration of solids in said dispersion attains a predetermined level.

14. A process for filtering solids/fluid dispersions wherein said dispersion comprises solids having a particle size distribution between about $0.1\mu$ to about $30\mu$ and wherein said solids in said dispersion constitutes no more than about 20% by weight of said dispersion and the viscosity of the dispersion is between about 20 to about 850 centipoises at 30° C. which comprises the steps of:

(a) circulating said dispersion under an average pressure driving force between about 15 to about 25 through apparatus which comprises filtration means having at least one rigid, tubular porous member having a micron rating between about 0.5 to about 5 microns to provide a flux rate sufficient to prevent any substantial numbers of particles having a particle size less than said micron rating from passing through said pores;

(b) periodically introducing a fluid at elevated pressures into said filtration means to maintain said flux rate;

(c) adding additional fluid to said dispersion during circulation thereof until said fluid attains a predetermined degree of purity;

(d) terminating the addition of said fluid and thereafter continuing circulating said dispersion until the concentration of said solids in said dispersion attains a predetermind level.

15. A process of claim 14 wherein said filtration means comprises a plurality of rigid, tubular porous members.

16. A process of claim 14 wherein the average particle size of said solids of said dispersion is about $3\mu$.

17. A process of claim 14 wherein the micron rating of said porous member is about 2.

18. A process of claim 14 wherein said average pressure driving force is between about 20 to about 25 psi.

19. Apparatus for filtration of solids/fluid dispersions wherein said dispersion comprises solids having a particle size distribution between about $0.1\mu$ to about $50\mu$ which comprises a reservoir for containing said dispersion, filtration means comprising at least one tubular member having a rigid porous wall providing pores having a micron rating between about 0.5 to about 5 microns; pump means for circulating said dispersion from the reservoir through said filration means at an average pressure driving force sufficient to prevent any substantial number of particles having a particle size less than said micron rating from passing through said pores so that filtration of said dispersion is achieved by removing fluid through said pores while increasing the concentration of solids in said dispersion and said dispersion is circulated from the reservoir through said hollow member, means to return said concentrated dispersion to said reservoir and means to periodically introduce a fluid at elevated pressure into said tubular member so that said average pressure driving force can be maintained substantially constant.

20. Apparatus of claim 19 further including means to add additional fluid to said dispersion.

21. Apparatus of claim 19 wherein said filtration means comprise a plurality of said tubular members.

22. Apparatus of claim 19 wherein said tubular porous member has a mircon rating of about $2\mu$.

23. Apparatus of claim 21 wherein said tubular porous members have a micron rating of about $2\mu$.

24. Apparatus of claim 19 where said average pressure driving force is between about 15 to about 25 psi.

* * * * *